United States Patent
Morita

(10) Patent No.: US 9,753,641 B2
(45) Date of Patent: Sep. 5, 2017

(54) DISPLAY INPUT DEVICE, CONTROL METHOD FOR DISPLAY INPUT DEVICE, AND COMPUTER-READABLE STORAGE MEDIUM FOR STORING CONTROL PROGRAM FOR DISPLAY INPUT DEVICE

(71) Applicant: KYOCERA Document Solutions Inc., Osaka (JP)

(72) Inventor: Yoshio Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/323,324

(22) PCT Filed: Mar. 1, 2016

(86) PCT No.: PCT/JP2016/056263
§ 371 (c)(1),
(2) Date: Dec. 30, 2016

(87) PCT Pub. No.: WO2016/152408
PCT Pub. Date: Sep. 29, 2016

(65) Prior Publication Data
US 2017/0131897 A1    May 11, 2017

(30) Foreign Application Priority Data
Mar. 26, 2015 (JP) .................. 2015-064880

(51) Int. Cl.
*G06F 3/0488* (2013.01)
*H04N 1/00* (2006.01)
*G06F 3/041* (2006.01)

(52) U.S. Cl.
CPC ........ *G06F 3/04886* (2013.01); *G06F 3/0418* (2013.01); *H04N 1/0049* (2013.01);
(Continued)

(58) Field of Classification Search
CPC .......... G06F 3/0488; G06F 3/041; H04N 1/00
See application file for complete search history.

(56) References Cited

U.S. PATENT DOCUMENTS 8,498,181 B1 * 7/2013 Bath .................. G06F 3/04886
368/243
9,146,623 B1 * 9/2015 Kuscher ............... G06F 3/0489
(Continued)

FOREIGN PATENT DOCUMENTS

JP    H 02-287609 A    11/1990
JP    2002-91677 A    3/2002
(Continued)

OTHER PUBLICATIONS

International Search Report dated Apr. 5, 2016, issued to the corresponding International Application No. PCT/JP2016/056263.
(Continued)

*Primary Examiner* — David Choi
(74) *Attorney, Agent, or Firm* — Stein IP, LLC

(57) ABSTRACT

This display input device (1) includes: a display panel (21) for displaying multiple symbol keys (K1) and an input display field (B1) in a software keyboard screen (S1); a touch panel part (22) for detecting a position touched; and a control unit (5) which recognizes an operated symbol key (K1a), causes the input display field (B1) to produce a normal display of a symbol when the touch position is within an inner region (F1) of the operated symbol key (K1a), and causes the display panel (21) to produce an alert display of a questionable symbol (y1) in a different manner than the normal display when the touch position is inside a peripheral region (F2) outside of the inner region (F1), the questionable symbol (y1) being the symbol corresponding to the operated symbol key (K1a) that is operated in the peripheral region (F2).

12 Claims, 11 Drawing Sheets

(52) U.S. Cl.
CPC ..... *H04N 1/00395* (2013.01); *H04N 1/00411* (2013.01); *H04N 2201/0094* (2013.01)

(56) References Cited

U.S. PATENT DOCUMENTS

| | | | | |
|---|---|---|---|---|
| 2012/0005615 A1* | 1/2012 | Gruber | ................ | G06F 3/03547 715/773 |
| 2012/0206370 A1* | 8/2012 | Ivanovic | ............. | G06F 3/04886 345/173 |
| 2012/0235838 A1* | 9/2012 | Xiong | ................... | G06F 3/0234 341/22 |
| 2013/0182015 A1* | 7/2013 | Kuo | .................... | G06F 3/04812 345/660 |
| 2014/0365932 A1* | 12/2014 | Hwang | ............... | G06F 3/04886 715/768 |
| 2015/0293694 A1* | 10/2015 | Bozzini | ................. | G06F 3/0219 715/773 |
| 2015/0301740 A1* | 10/2015 | Bozzini | ............... | G06F 3/04886 715/773 |
| 2015/0309724 A1* | 10/2015 | Wu | ..................... | G06F 3/04886 715/773 |
| 2016/0139803 A1* | 5/2016 | Yan | ....................... | G06F 3/0216 715/773 |
| 2017/0131897 A1* | 5/2017 | Morita | ................ | G06F 3/04886 |

FOREIGN PATENT DOCUMENTS

| | | |
|---|---|---|
| JP | 2006-285598 A | 10/2006 |
| JP | 2015-32016 A | 2/2015 |

OTHER PUBLICATIONS

Written Opinion of the International Searching Authority issued on Apr. 5, 2016 in PCT/JP2016/056263.

* cited by examiner

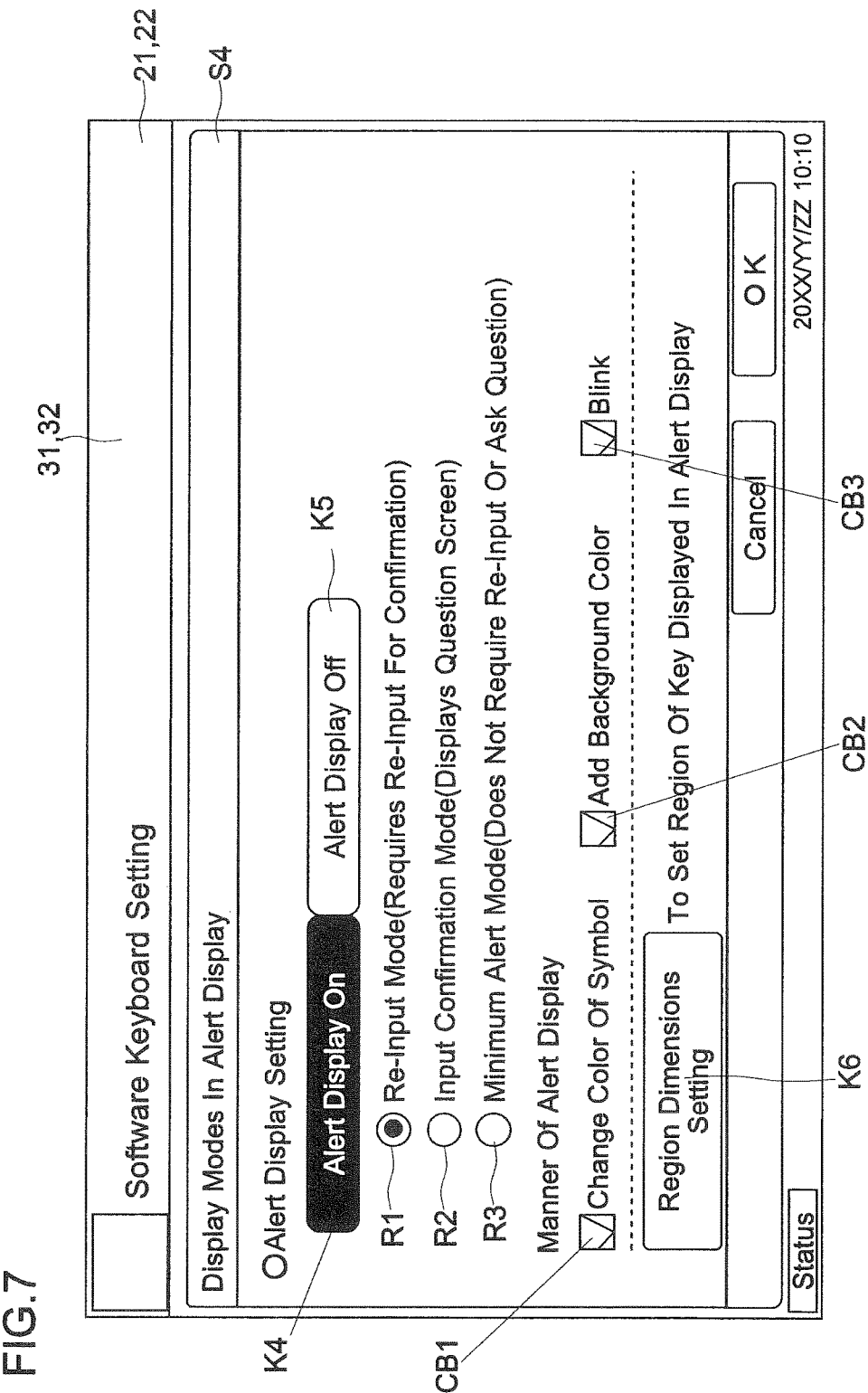

| SYMBOL INPUT ITEMS | GROUP | MANNER OF EXPANSION |
|---|---|---|
| FAX NUMBER (ADDRESS BOOK) | EXPANSION GROUP | ENTIRELY PERIPHERAL REGION |
| E-MAIL ADDRESS (ADDRESS BOOK) | EXPANSION GROUP | PERIPHERAL REGION WIDTH DOUBLED |
| DEPARTMENT (USER INFORMATION) | NORMAL GROUP | NO EXPANSION AT ALL |
| ... | ... | ... |

DISPLAY INPUT DEVICE, CONTROL METHOD FOR DISPLAY INPUT DEVICE, AND COMPUTER-READABLE STORAGE MEDIUM FOR STORING CONTROL PROGRAM FOR DISPLAY INPUT DEVICE

CROSS-REFERENCE TO RELATED APPLICATIONS

This application is a national stage of International Application No. PCT/JP2016/056263, filed Mar. 1, 2013, which claims the benefit of priority to Japanese Application No. 2015-064880, filed Mar. 26, 2015, in the Japanese Patent Office, the disclosures of which are incorporated herein in their entireties by reference.

TECHNICAL FIELD

The present invention relates to a display input device which receives inputs of various symbols such as letters, digits, and marks. The present invention also relates to a method and a program for controlling such a display input device.

BACKGROUND ART

In some devices provided with a display panel having a touch panel, a software keyboard is used to receive inputs of symbols such as letters, digits, and marks. An example of the input devices (information terminals) that display a software keyboard is described in Patent Literature 1 listed below.

Specifically, Patent Literature 1 describes an input device that displays a plurality of operation items. When a touch panel is pressed down, the pressing-down position at which the pressing-down is performed is detected, and at least one operation item is judged to be an input item. A predetermined range including an operation item corresponding to the position of the pressing-down is displayed in an expanded manner, and when the pressing-down of the touch panel is finished, an operation item corresponding to a final pressing-down position at which the touch panel has been pressed down for the last time is judged to be an input item. This configuration is an attempt to achieve an improved user-friendliness (see claim 1, paragraphs [0005], [0006], etc. of Patent Literature 1).

CITATION LIST

Patent Literature

Patent Literature 1: Japanese Patent Application Publication No. 2002-091677

SUMMARY OF INVENTION

Technical Problem

Examples of display input devices include an image forming apparatus, such as a multifunction peripheral, which is provided with an operation panel for a setting operation. There, a software keyboard is sometimes displayed on a display panel in the operation panel. A user operates the software keyboard to input symbols such as letters, digits, and marks. Thereby, information including, for example, an address and a user name can be registered. In other devices such as smart phones and tablet terminals, as well, a software keyboard is sometimes displayed for inputs of symbol.

In inputting an address, a destination number, a residence address, etc. on a software keyboard, a user sometimes operates a wrong symbol key (input error) and continues operating the software keyboard without becoming aware of the input error. In some of such cases, users do not become aware of such an operation error until after they input a plurality of more symbols, or the last symbol.

In such cases, users move a cursor, or returns the cursor back to an erroneously inputted symbol to delete it and input a correct symbol instead. The software keyboard is inconvenient in that it takes time to perform correction to an erroneously inputted symbol by means of the software keyboard. Further, users sometimes delete a correct symbol while correcting an input error, and this is sometimes troublesome to the users.

To deal with such inconveniences, the input device described in Patent Literature 1 offers expanded display but does not include anything devised to help users become aware of the possibility of their having operated a wrong symbol key. Thus, with the input device described in Patent Literature 1, it is difficult for users to become aware that they have operated a wrong symbol key. The input device of Patent Literature 1 does not fully address the above problems.

In view of the above problems, according to the present invention, when there is a possibility that a user has operated a wrong symbol key, an alert display is automatically produced to help the user, who has operated the wrong symbol key, to become aware of the input error.

Solution to Problem

To solve the above problems, a display input device according to claim 1 includes a display panel, a touch panel unit, and a control unit. The display panel displays a software keyboard screen including a plurality of arranged symbol keys and an input display field for displaying a symbol corresponding to any of the plurality of symbol keys a display position of which has been touched. The touch panel unit is provided with respect to the display panel, and detects a touch position touched by a user. The control unit recognizes an operated symbol key based on output of the touch panel unit, the operated symbol key being any of the plurality of symbol keys that is displayed at the touch position touched by the user. The control unit makes the input display field produce a normal display of a symbol corresponding to the operated symbol key when the touch position is inside a predetermined inner region of a region of the operated symbol key. The control unit makes the display panel produce an alert display of a questionable symbol when the touch position is inside a peripheral region, the questionable symbol being a symbol corresponding to the operated symbol key operated in the peripheral region, the peripheral region being a region outside of the inner region in the region of the operated symbol key.

Advantageous Effects of Invention

As described above, according to the present invention, when there is a possibility that a wrong symbol key has been operated, an alert display is automatically performed. By the alert display, it is possible to display a questionable symbol in an emphasized manner, to thereby make a user become aware of an input error soon after he or she operates a wrong symbol key.

BRIEF DESCRIPTION OF THE DRAWINGS

FIG. 5 is a diagram illustrating an example of an address book registration screen according to the embodiment;

FIG. 6 is a diagram illustrating an example of an alert display according to the embodiment;

FIG. 7 is a diagram illustrating an example of an alert setting screen according to the embodiment;

DESCRIPTION OF EMBODIMENTS

Hereinafter, embodiments of the present invention will be described with reference to FIG. 1 to FIG. 17. Here, the present invention, which is applicable to various devices, will be described by taking, as an example of a display input device 1, a multifunction peripheral 100 (equivalent to an image forming apparatus). It should be understood, however, that factors such as configurations and arrangements described herein are merely illustrative examples, and are not to be construed as limiting on the present invention.

Outline of Multifunction Peripheral 100: Next, a description will be given of an outline of the multifunction peripheral 100 according to an embodiment, with reference to FIG. 1 and FIG. 2.

Figure 1:
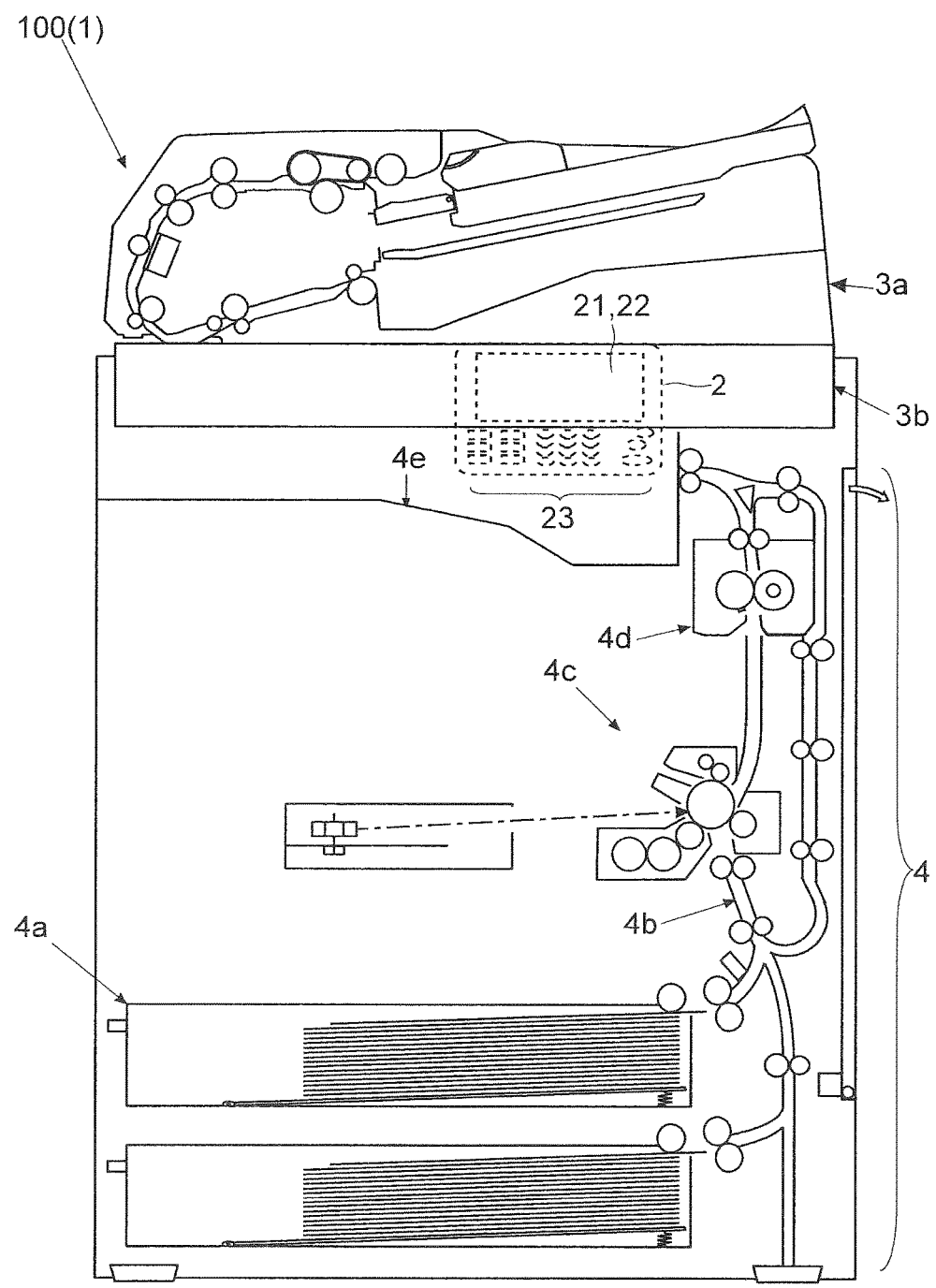
FIG. 1 is a diagram illustrating an example of a multi-function peripheral according to an embodiment.

As illustrated in FIG. 1, the multifunction peripheral 100 includes an operation panel 22 (indicated by a broken line) disposed in a front face of the multifunction peripheral 100. The multifunction peripheral 100 further includes a document conveyance unit 3a and an image reading unit 3b both disposed in an upper part of the multifunction peripheral 100. Further, inside the multifunction peripheral 100, there is disposed a printing unit 4 (a sheet feeding unit 4a, a conveyance unit 4b, an image forming unit 4c, and a fixing unit 4d), which performs printing.

The operation panel 2 includes a display panel 21, which displays notifications of a condition of the multifunction peripheral 100, various messages, and various setting screens. Further, a touch panel unit 22 is disposed in an upper surface of the display panel 21. The touch panel unit 22 is provided for detecting a position, or coordinates, of a pressed part of the display panel 21. Based on an output of the touch panel unit 22, a pressed operation image (an image of a soft key, a button, a tab, a check box, or the like) is recognized. Further, the operation panel 2 also includes a plurality of hardware keys 23 including a start key and a numerical keypad.

The document conveyance unit 3a automatically conveys set document sheets continuously one by one toward a reading contact glass (a reading position, not shown). The image reading unit 3b generates image data by reading a document sheet passing over a feed-reading contact glass or a document placed on a placement-reading contact glass (not shown).

The sheet feeding unit 4a accommodates a plurality of sheets, and feeds the sheets one by one into the conveyance unit 4b during a printing job. The conveyance unit 4b conveys a sheet fed from the first sheet feeding unit 4a. The image forming unit 4c forms a toner image based on image data, and transfers the toner image onto a sheet conveyed thereto. The fixing unit 4d fixes the transferred toner image on the sheet. The sheet having the toner image fixed thereon is discharged into a discharge tray 4e.

Figure 2:
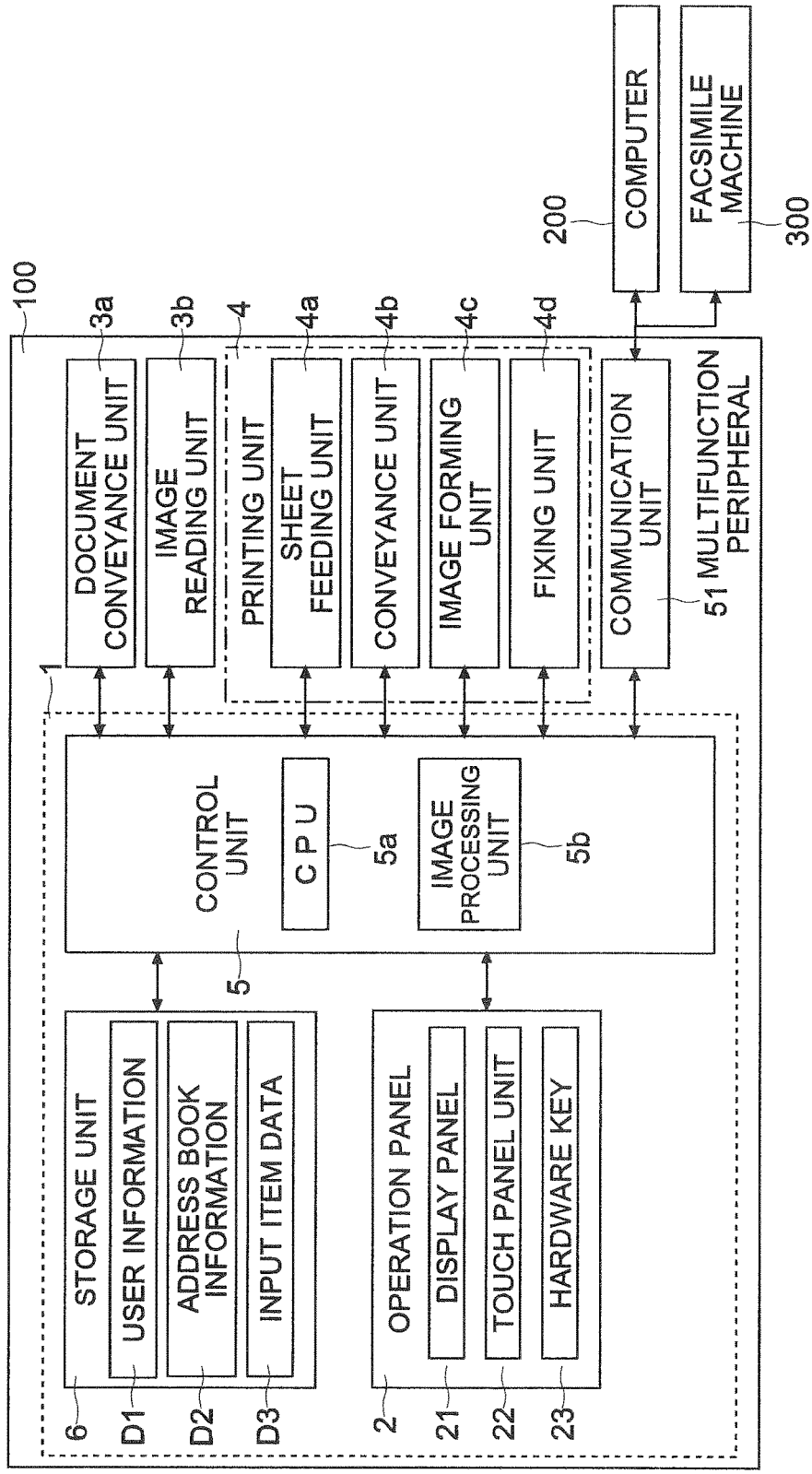
FIG. 2 is a diagram illustrating an example of the multifunction peripheral according to the embodiment.

As illustrated in FIG. 2, a control unit 5 is provided inside the multifunction peripheral 100. The control unit 5 controls operations of the multifunction peripheral 100. The control unit 5 is connected to portions such as the operation panel 2, the document conveyance unit 3a, the image reading unit 3b, the printing unit 4, and a communication unit 51 by means of a bus, a signal line, etc. The control unit 5 controls the operations of the multifunction peripheral 100 such as a scanning operation and a printing operation by controlling such portions. The control unit 5 includes circuits such as a CPU 5a and an image processing unit 5b.

The CPU 5a controls various portions of the multifunction peripheral 100 and performs various computing processes based on programs and data stored in a storage unit 6. The image processing unit 5b performs image processing on image data.

The storage unit 6 is built as a combination of a nonvolatile storage device, such as an ROM or an HDD, and a volatile storage device, such as an RAM.

The control unit 5 is connected to the communication unit 51. The communication unit 51 is communicably connected to a computer 200 and a facsimile machine 300, for example, via a network, a public line, a cable, etc.

Display Input Device 1: Next, a description will be given of a display input device 1 according to the embodiment, with reference to FIG. 2. The display input device 1 includes the operation panel 2 (the display panel 21, the touch panel unit 22), the control unit 5, and the storage unit 6. Here, functions of the control unit 5 may be divided, and there may be provided a panel control unit, which is a substrate on which a memory is mounted, which recognizes a setting operation performed by a user, and which makes the display panel 21 switch screens according to the operation. In that case, it can be said that the operation panel 2 is the display input device 1.

As described above, the display panel 21 displays setting screens and operation images such as images of a key, a button, a tab, a check box, and a radio button. The control unit 5 controls displays on the display panel 21. The touch panel unit 22 is disposed on the display panel 21. The control unit 5 detects a touch position (coordinates) based on an output of the touch panel unit 22. Then, the control unit 5 recognizes that an operation image (displayed) on the touch position (coordinates) has been operated. Then, the control unit 5 makes the display panel 21 display a screen corresponding to the operation image that has been operated.

Input of Symbols in Display Input Device 1: Next, a description will be given of an example of the inputting of a symbol in the display input device 1 according to the embodiment, with reference to FIG. 3 to FIG. 6.

The display input device 1 receives inputs of symbol strings as user information, address information, etc. Symbols include letters, digits, and marks. That is, the alphabet letters, the Chinese characters, and the Japanese syllabaries can be inputted as symbols. Digits and marks such as @, period, and comma can also be inputted as symbols.

Figures 3, 4:
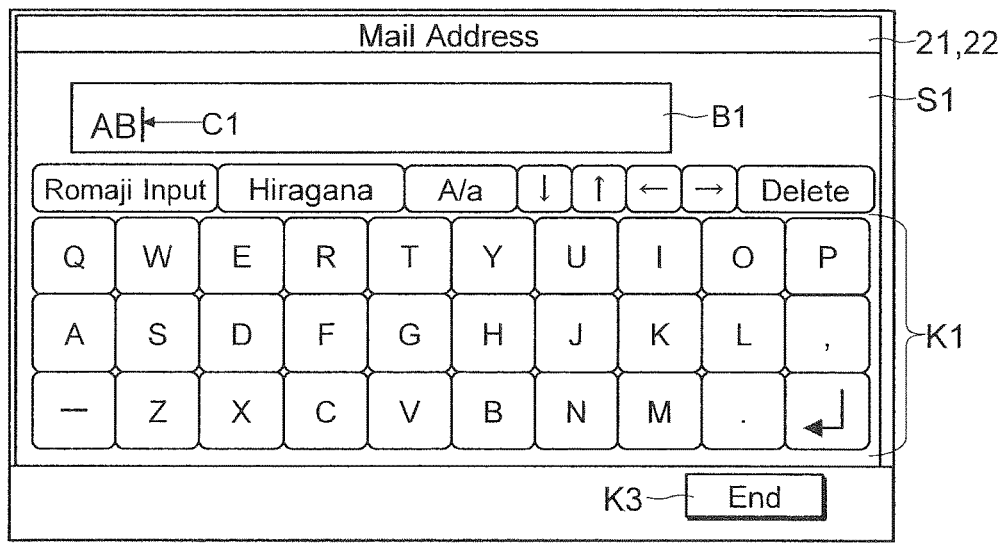
FIG. 3 is a diagram illustrating an example of a software keyboard screen according to the embodiment.
FIG. 4 is a diagram illustrating an example of a user registration screen according to the embodiment.

To receive an input of a symbol, the control unit 5 makes the display panel 21 display a software keyboard screen S1 (see FIG. 3). In the software keyboard screen S1, a plurality of symbol keys K1 are arranged. FIG. 3 illustrates how the plurality of symbol keys K1 are arranged. Each alphabet letter corresponds to a symbol key K1. The alphabet letters can be directly inputted, and the Chinese characters and the Japanese syllabaries (Hiragana) can be inputted by inputting the alphabet letters and then converting the alphabet letters into the Chinese characters and the Japanese syllabaries (Romaji input). The software keyboard screen S1 also includes an input display field B1 for displaying an input result. By performing predetermined operations, it is possible to input and display the symbol keys K1 corresponding to various marks and symbols.

A user touches some of the symbol keys K1 in the software keyboard screen S1 according to a desired symbol string (letter string). Based on output of the touch panel unit 22, the control unit 5 recognizes the keys (operated symbol keys K1a) operated among the symbol keys K1. Then, the control unit 5 displays, in the input display field B1, a result of the input made by the user by operating the keys. In the example illustrated in FIG. 3, the user has touched an "A" key and then "B" key of the symbol keys K1. Note that, in the input display field B1, there is also displayed a blinking vertical line (a cursor C1), which indicates a position where a symbol is going to be displayed when a next symbol key K1 is touched. As more symbols are inputted, the control unit 5 moves the cursor C1 more to the right.

Items to be inputted by means of symbols (symbol input items) include items regarding user registration. For authorization of usage of the multifunction peripheral 100, transmission of image data obtained by reading, and the like, it is necessary to register information with respect to items regarding the user. FIG. 4 illustrates a user registration screen S2 for setting and registering user information.

The symbol input items also include items regarding address book registration. FIG. 5 illustrates an address book registration screen S3 for registering information on items regarding an address book. Registered in the address book are addresses including e-mail addresses, network addresses, fax numbers, addressee names, etc. This makes it possible to complete settings of an addressee just by selecting the address or the name of an addressee to whom the user wishes to transmit image data. The user does not have to input an address or an addressee name each time he/she transmits image data. The symbol input items include more in addition to the items regarding user registration and the address book, but detailed description thereof will be omitted.

The user registration screen S2 and the address book registration screen S3 can be displayed by the user performing predetermined operations on the display panel 21. In each of the screens for user registration and address book registration, there are displayed titles of the symbol input items such as user name, address name, password, address, path, fax number, etc. And, the control unit 5 displays registered symbol strings under the titles of corresponding symbol input items (see FIG. 4 and FIG. 5).

Alteration keys K2 are provided one for each of the symbol input items (see FIG. 4 and FIG. 5). The user touches a position of the alteration key K2 provided for a symbol input item with respect to which the user wishes to register or alter registration. For example, when the user wished to set an e-mail address, he or she operates the alteration key K2 corresponding to e-mail address. When the alteration key K2 is operated, the control unit 5 makes the display panel 21 display the software keyboard screen S1. When an End key K3 is operated on the software keyboard screen S1, the control unit 5 makes the storage unit 6 store what is displayed in the input display field B1 at the time as data (user information D1, address book information D2) corresponding to the symbol input item.

Outline of Alarm Display: Next, a description will be given of an alert display in the display input device 1 according to the embodiment, with reference to FIG. 6 to FIG. 8.

To input addresses including a path, an e-mail address, a fax number, etc., a user inputs them by performing a plurality of touches on some of the symbol keys K1. Here, however, the user sometimes operates a wrong symbol key K1, believing that he or she is touching a correct symbol key K1. Then, without becoming aware of the error he or she has made, the user sometimes continues touching the symbol keys K1 (operations with respect to the symbol keys K1).

In such a case, the input error is sometimes corrected by using a back space key to reach the erroneously inputted symbol by deleting all the symbols inputted after the erroneously inputted symbol, to start over the input. With a model that is able to freely move the cursor C1 to different positions, it is possible to move the cursor C1 to a position of an erroneously inputted symbol, delete the wrong symbol, and subsequently put a correct symbol at an appropriate position. These corrections need to be done when the user erroneously believes that he or she has completed the input of the symbol string, and this makes the corrections even more troublesome to the user. If, on the other hand, the user is able to become aware that he or she has made an input error almost simultaneously when he or she makes the input error, the input error can be corrected soon after it is made, and thus easily.

To deal with the above inconvenience, the control unit 5 is configured to judge whether there is a possibility of an input error having been made. If the control unit 5 judges that there is a possibility of an input error, the control unit 5 makes a symbol (a questionable symbol y1) corresponding to an operated symbol key K1a that presumably has been erroneously operated be displayed in an alert display, which is different from a normal display.

The control unit 5 makes a judgment on the possibility of an input error based on a touch position with respect to a symbol key K1. Specifically, with respect to each of the symbol keys K1, the control unit 5 makes a judgment on the possibility of an input error according to whether a touch region in which the touch position exists is inside an inner region F1 or inside a peripheral region F2.

Here, the inner region F1 is a region of a display region of each symbol key K1 (an operated symbol key K1a); the inner region F1 is a region of predetermined dimensions including a center of the display region. The peripheral region F2 is an exterior region (a surrounding region) that surrounds the inner region F1. The control unit 5 recognizes the operated symbol key K1 based on output of the touch panel unit 22, and judges, based on the coordinates of the touch position, within which region of the display region of the symbol key K1 the touch position exists, the inner region F1 or the peripheral region F2.

When the touch position is within the inner region F1, the control unit 5 makes the input display field B1 produce a normal display of a symbol corresponding to the operated symbol key K1a. The control unit 5 makes the input display field B1 display the symbol corresponding to the operated symbol key K1 a in a color determined to be used in the normal display, such as black, without any special emphasis nor decoration in terms of display.

On the other hand, when the touch position is within the peripheral region F2, the control unit 5 recognizes the symbol corresponding to the operated symbol key K1a as a questionable symbol y1. Then, the control unit 5 makes the input display field B1 produce an alert display of the questionable symbol y1. FIG. 6 illustrates an example of such an alert display. The background color of the input display field B1 in the software keyboard screen S1 illustrated in FIG. 6 is white. In FIG. 6, "B" is a questionable symbol y1. The symbol "B" in the input display field B1 is displayed in a color previously determined as an emphasizing letter color, such as red, and is also highlighted (displayed with an additional background color), and this is different from the manner in which a normal display of the symbol "A" is produced (black against a white background). Thus, the control unit 5 displays the symbol corresponding to the operated symbol key K1a, which has been touched in the peripheral region F2, in a different color, in a highlighted manner, and thereby an alert display is produced.

And, there is provided a setting screen for alert display settings. FIG. 7 is a diagram illustrating an alert setting screen S4 as an example of the setting screen. In response to a predetermined operation performed on the operation panel 2, the control unit 5 makes the display panel 21 display the alert setting screen S4.

The alert setting screen S4 includes an ON key K4 and an OFF key K5 for making a setting on whether to perform an alert display. That is, the display panel 21 displays the ON key K4 for the user to set such that an alert display is to be performed, and the OFF key K5 for the user to set such that no alert display is to be performed. The user operates the ON key K4 if he or she wishes an alert display to be performed, and operates the OFF key K5 if he or she wishes to set such that no alert display will be produced. The control unit 5 recognizes whether to produce an alert display by recognizing which of the ON key K4 and the OFF key K5 has been operated based on output of the touch panel unit 22. In the example illustrated in FIG. 7, the ON key K4 has been operated to set such that an alert display is to be performed. The control unit 5 makes the display panel 21 produce an alert display of the questionable symbol y1 only in a case where the ON key K4 has been operated to set such that an alert display is to be performed. In a case where the OFF key K5 has been operated to set such that no alert display is to be performed, the control unit 5 does not make the display panel 21 produce the alert display of the questionable symbol y1.

Further, regarding the alert display, there are provided a re-input mode, an input confirmation mode, and a minimum alert mode. In other words, the display input device 1 has a plurality of display modes as modes in which to produce an alert display of the questionable symbol y1. To select whichever of the three modes for producing the alert display, three radio buttons R1, R2, and R3 are provided in the alert setting screen S4. The control unit 5 recognizes a position of an operated one of the radio buttons, and recognizes that the mode corresponding to the operated radio button has been selected. Details of each display mode will be described later.

Further, the display input device 1 of the present embodiment is provided with a check box CB1 for determining a manner in which to produce an alert display. Specifically, it is possible to make a selection with respect to each of the following points: whether to use a color different from in the normal display (change color from black in the normal display to red); whether to add a color (highlight) to the background of the questionable symbol y1; and whether to make the questionable symbol y1 blink. Here, at least one of three check boxes CB1, CB2, and CB3 is to be checked.

Further, the alert setting screen S4 is provided also with a region setting key K6 (see FIG. 7). On recognizing that the region setting key K6 has been operated, the control unit 5 makes the display panel 21 display a region setting screen S5 as illustrated in FIG. 8.

The region setting screen S5 is a screen for setting the dimensions of the inner region F1 and the peripheral region F2 with respect to the symbol keys K1. In the region setting screen S5, there are arranged two value input fields B2 and B3 for determining the dimensions of the inner region F1, and four value input fields B4, B5, B6, and B7 for determining the dimensions of the peripheral region F2. The values for items "a" to "f" can be set by touching display regions of the value input fields and operating the numerical keypad. Or, the dimensions of the inner region F1 and the peripheral region F2 may be set by inputting values via a software keyboard screen S1 for inputting values displayed when the display regions of the value input fields B2 to B7 are touched.

Figure 8:
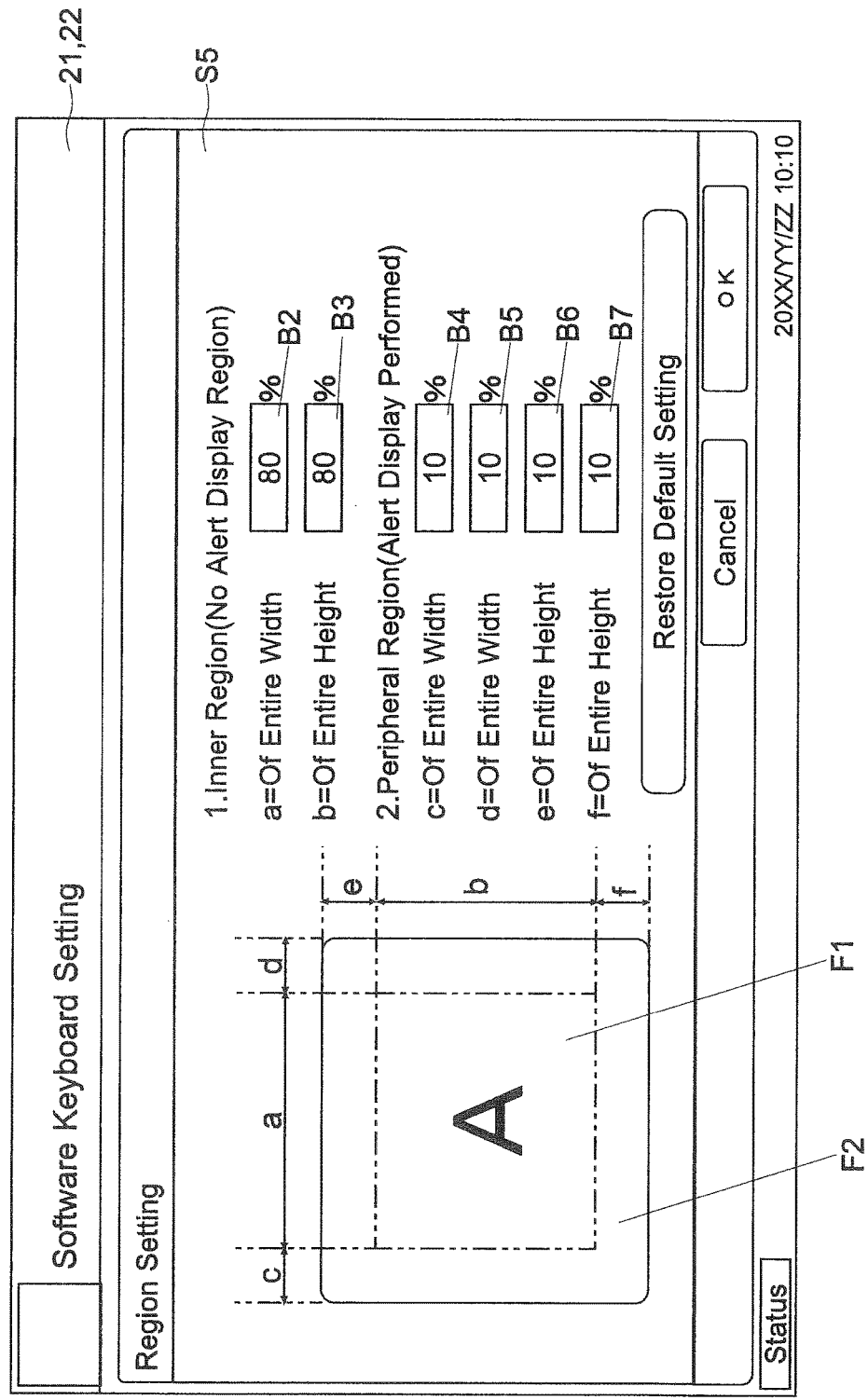
FIG. 8 is a diagram illustrating an example of a region setting screen according to the embodiment.

What can be set regarding a lateral direction of the symbol keys K1 are the following: a proportion of a lateral width of the inner region F1 with respect to a lateral width of the symbol keys K1 (a value of "a" in FIG. 8); a proportion of a left-side width of the peripheral region F2 with respect to the lateral width of the symbol keys K1 (a value of "c" in FIG. 8); and a proportion of a right-side width of the peripheral region F2 with respect to the lateral width of the symbol keys K1 (a value of "d" in FIG. 8). Here, the total of the values of "a", "c" and "d" is 100%.

On the other hand, what can be set regarding a vertical direction of the symbol keys K1 are the following: a proportion of a vertical width of the inner region F1 with respect to a vertical width of the symbol keys K1 (a value of "b" in FIG. 8); a proportion of an upper-side width of the peripheral region F2 with respect to the vertical width of the symbol keys K1 (a value of "e" in FIG. 8); and a proportion of a lower-side width of the peripheral region F2 with respect to the vertical width of the symbol keys K1 (a value of "f" in FIG. 8). Here, the total of the values of "b", "e" and "f" is 100%.

Here, by setting the values of "a" and "b" regarding the inner region F1 to 0, the value of "c"+"d" to 100, and the value of "e"+"f" to 100, too, it is possible to set such that an alert display will be produced whenever any of the symbol keys K1 is operated. In other words, it is possible to set such that the region of each of the symbol keys K1 is entirely the peripheral region F2, and with such a setting, the control unit 5 makes the display panel 21 produce an alert display whenever any of the symbol keys K1 is operated.

In this manner, the control unit 5 makes the display panel 21 display the region setting screen S5 for setting the dimensions of the inner region F1 and the peripheral region F2. Then, based on the dimensions of the regions set in the region setting screen S5, the control unit 5 recognizes whether a touch position is inside the inner region F1 or inside the peripheral region F2.

Re-input mode: Next, a description will be given of an alert display produced in the re-input mode in the display input device 1 according to the embodiment, with reference to FIG. 9 to FIG. 11.

Figure 9:
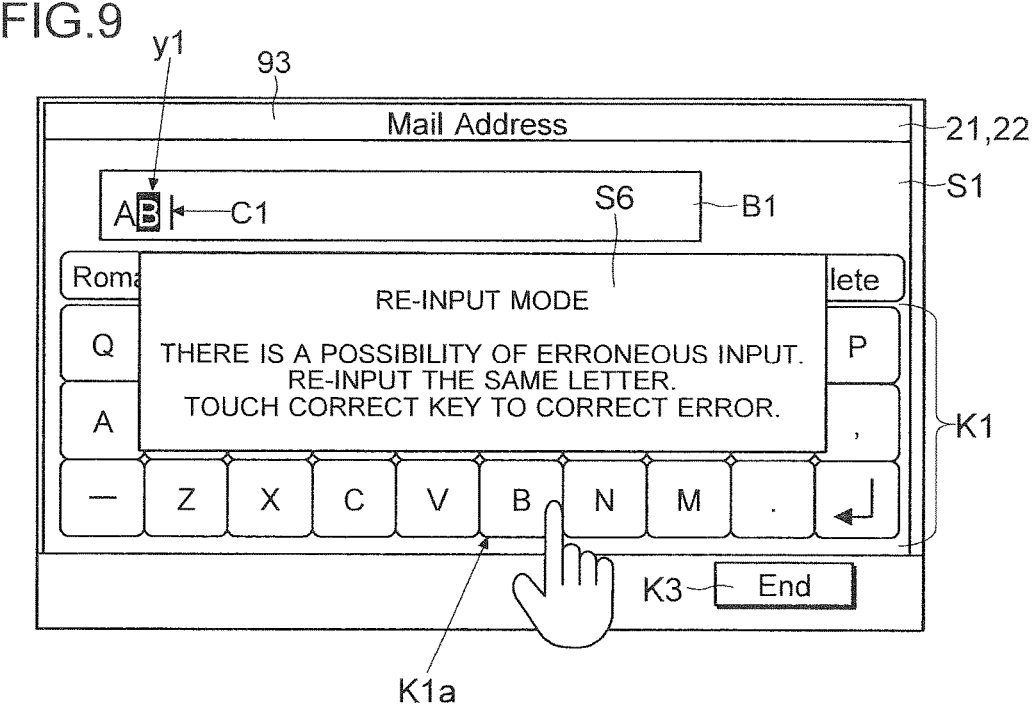
FIG. 9 is a diagram illustrating an example of a display in a re-input mode according to the embodiment.

In the re-input mode, the user is requested to operate (touch) a symbol key K1 same as a symbol key K1 corresponding to a questionable symbol y1 again to confirm the questionable symbol y1. Re-input is requested to thereby prevent overlooking of an input error. Specifically, when the peripheral region F2 of an operated symbol key K1a is touched in a state where the re-input mode has been selected in advance, the control unit 5 makes the display panel 21 display a message screen S6 (see FIG. 9). As illustrated in FIG. 9, the message screen S6 includes a message notifying that the user has made an input error and a message requesting the user to perform reoperation. The control unit 5 makes the display panel 21 display the message screen S6 to be superimposed on the software keyboard screen S1. Here, the control unit 5 makes the display panel 21 display the message screen S6 so as not to overlap the operated symbol key K1a (the one of the symbol keys K1 that corresponds to the questionable symbol y1).

When the symbol key touched first after the message screen S6 is displayed is a symbol key K1 that corresponds to the questionable symbol y1 (that is, when the same symbol key K1 is touched again), it means that the user's intention that there is no need of correcting the inputted symbol has been confirmed. Thus, the control unit 5 recognizes the retouching operation as an operation to confirm the questionable symbol y1 to be the correct symbol to be inputted. Then, the control unit 5 makes the display panel 21 cancel the alert display of the questionable symbol y1, and makes the display panel 21 produce a normal display of the questionable symbol y1. The user goes on to input the next symbol.

Figure 10:
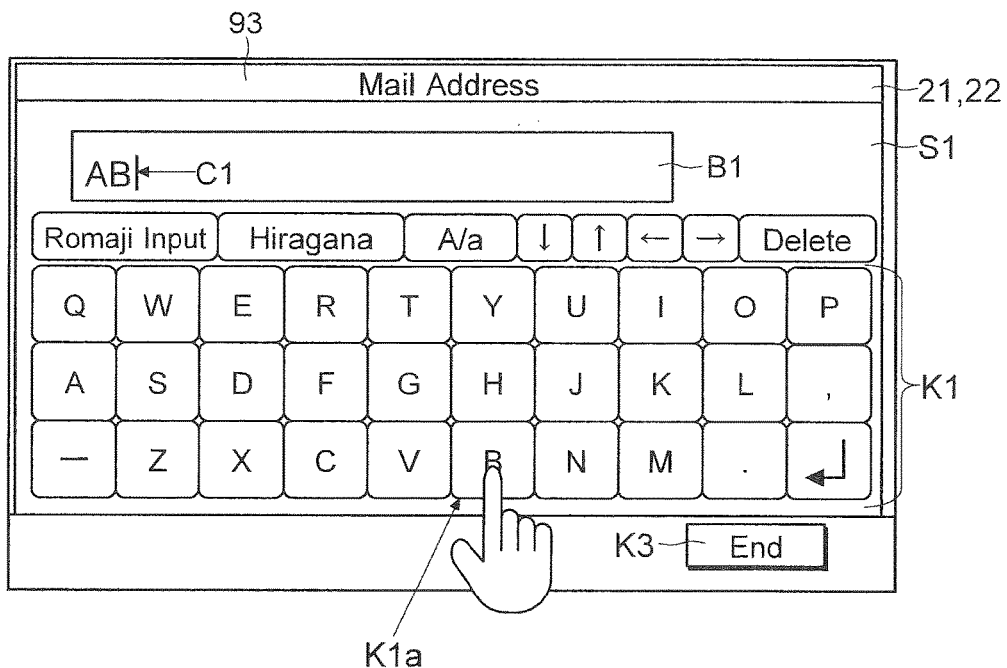
FIG. 10 is a diagram illustrating an example of a state where a symbol has been confirmed in a re-input mode according to the embodiment.

FIG. 10 illustrates an example of the software keyboard screen S1 of a case where the symbol key "B" of the symbol keys K1 is touched again after the peripheral region F2 of the symbol key "B" is touched and the message screen S6 is displayed. In FIG. 10, the control unit 5 recognizes the input of the symbol "B" as a correct input. The control unit 5 cancels the alert display of the symbol "B" in the input display field B1 (makes the display field B1 produce a normal display of the symbol "B" instead).

On the other hand, when the key touched first after the message screen S6 is displayed is not the symbol key K1 that corresponds to the questionable symbol y1 (that is, when a different symbol key K1 is touched), it means that the inputted symbol is a wrong one and that the user's intention to require correction has been confirmed. Thus, in this case, the control unit 5 recognizes an operation on another symbol key K1 as a command to replace the questionable symbol y1 with a correct symbol, which corresponds to the symbol key K1 touched first after the message screen S6 is displayed. Then, the control unit 5 deletes the questionable symbol y1 and makes the input display field B1 produce a normal display of the correct symbol (instead of the questionable symbol y1).

Here, in the correction performed after the message screen S6 is displayed, the control unit 5 may recognize an operation of touching a symbol key K1 other than the symbol key K1 corresponding to the questionable symbol y1 a predetermined number of times as an operation commanding symbol correction. The predetermined number of times may be appropriately determined, and may be two to three times.

Figure 11:
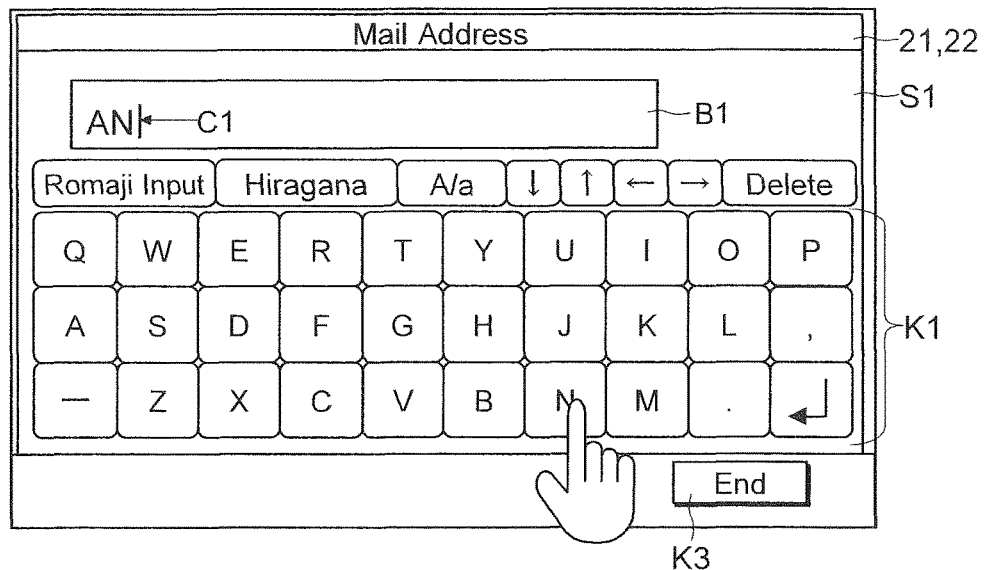
FIG. 11 is a diagram illustrating an example of a symbol correction in a re-input mode according to the embodiment.

FIG. 11 illustrates a case in which a symbol key K1 that corresponds to "N", which is adjacent to the symbol key K1 that corresponds to "B", is operated after the message screen S6 is displayed by operating the one of the symbol keys K1 corresponding to "B". When the symbol key K1 corresponding to "N" has been touched the predetermined number of times after the message screen S6 is displayed, the control unit 5 recognizes that the symbol "B" needs to be replaced with the symbol "N". Then, as illustrated in FIG. 11, the control unit 5 produces a normal display of the symbol "N" instead of the symbol "B", which has been displayed in the input display field B1 as the questionable symbol y1.

Input Confirmation Mode: Next, with reference to FIG. 12 to FIG. 15, a description will be given of an alert display produced in an input confirmation mode of the display input device 1 according to the embodiment.

In the input confirmation mode, a questionable symbol y1 is displayed, and there is also displayed an input confirmation screen S7, which includes a plurality of keys for confirming whether an input is correct, and the user is inevitably made to confirm whether an input is an erroneous input. This helps prevent the user from continuing to input symbols leaving an erroneously inputted symbol uncorrected.

Figure 12:
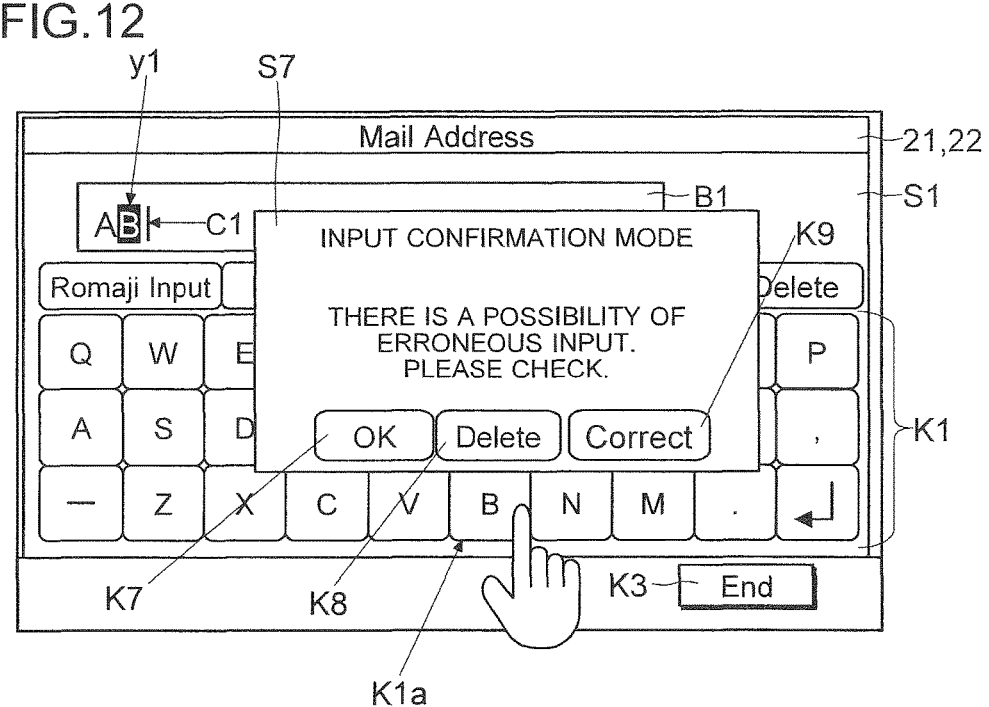
FIG. 12 is a diagram illustrating an example of a display in an input confirmation mode according to the embodiment.

Specifically, when the peripheral region F2 of an operated symbol key K1a is touched in a state where the input confirmation mode has been selected in advance, the control unit 5 makes the display panel 21 display an input confirmation screen S7. As illustrated in FIG. 12, the input confirmation screen S7 includes a message, a confirmation key K7, a delete key K8, and a correction key K9. The control unit 5 makes the display panel 21 display the input confirmation screen S7 to be superimposed on the software keyboard screen S1. Here, the control unit 5 makes the display panel 21 display the input confirmation screen S7 so as not to overlap with a symbol key K1 that corresponds to the symbol key K1a operated last (the symbol key K1 corresponding to the questionable symbol y1).

If there is no need of correcting the inputted symbol, the user touches the confirmation key K7. When the confirmation key K7 is touched (operated), the control unit 5 confirms that the questionable symbol y1 is the correct symbol to be inputted. Then, the control unit 5 makes the display panel 21 cancel added highlight, change in color of the symbol, or blinking display, and makes the display panel 21 produce a normal display of the questionable symbol y1. The user is now allowed to go on to input more symbols.

Figure 13:
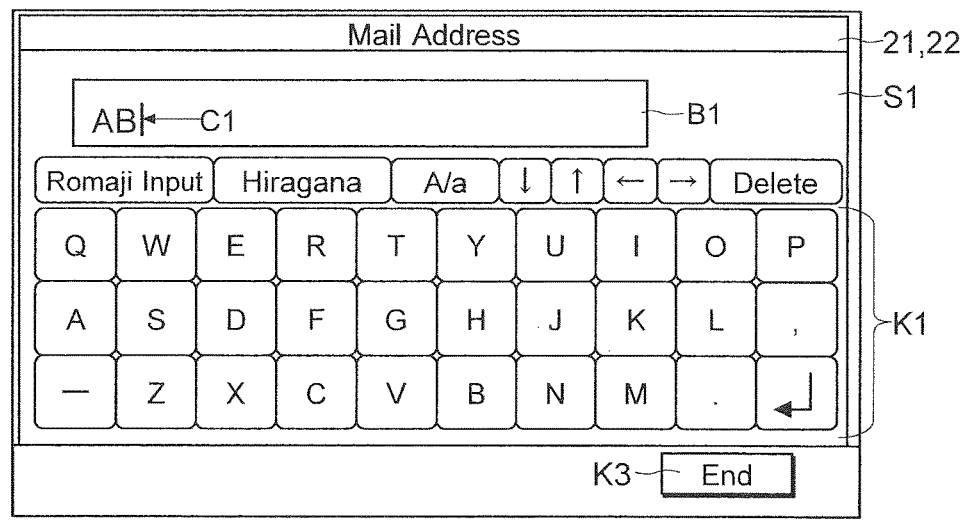
FIG. 13 is a diagram illustrating an example of a case where an OK key according to the embodiment has been operated.

FIG. 13 illustrates an example of the software keyboard screen S1 when the confirmation key K7 is operated after the input confirmation screen S7 is displayed based on operation performed on the symbol key K1 corresponding to the symbol "B". The control unit 5 recognizes an operation performed on the confirmation key K7 as an operation to confirm the questionable symbol y1, and thus recognizes that the input of the symbol "B" (the questionable symbol y1) is correct. Then, as illustrated in FIG. 13, the control unit 5 cancels the alert display of the symbol "B" in the input display field B1, and produces a normal display of the symbol "B".

When the user wishes to delete an inputted symbol, he or she touches the delete key K8. When the delete key K8 is touched (operated), the control unit 5 recognizes the questionable symbol y1 as a symbol to be deleted. Then, the control unit 5 deletes the questionable symbol y1 from the input display field B1. Then, the user is allowed to go on to input the correct symbol.

Figure 14:
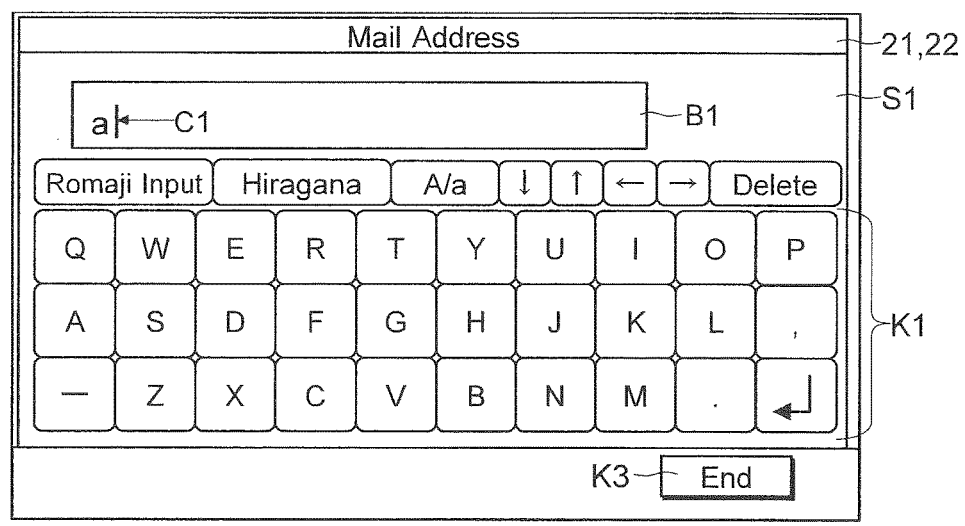
FIG. 14 is a diagram illustrating an example of a case where a delete key according to the embodiment has been operated.

FIG. 14 illustrates an example of the software keyboard screen S1 of a case in which the delete key K8 is operated after the input confirmation screen S7 is displayed based on an operation performed on the symbol key K1 corresponding to the symbol "B" in FIG. 12. When the delete key K8 is operated, the control unit 5 deletes the symbol "B" from the input display field B1.

When the user wishes to correct an inputted symbol, he or she touches the correction key K9. The control unit 5 recognizes the touch (operation) performed on the correction key K9 as a command to perform correction by replacing the questionable symbol y1 with a symbol corresponding to a symbol key K1 that is touched soon after the correction key K9 is touched. Then, the control unit 5 deletes the questionable symbol y1 and makes the input display field B1 produce a normal display of the correct symbol (instead of the questionable symbol y1).

Figures 15, 16:
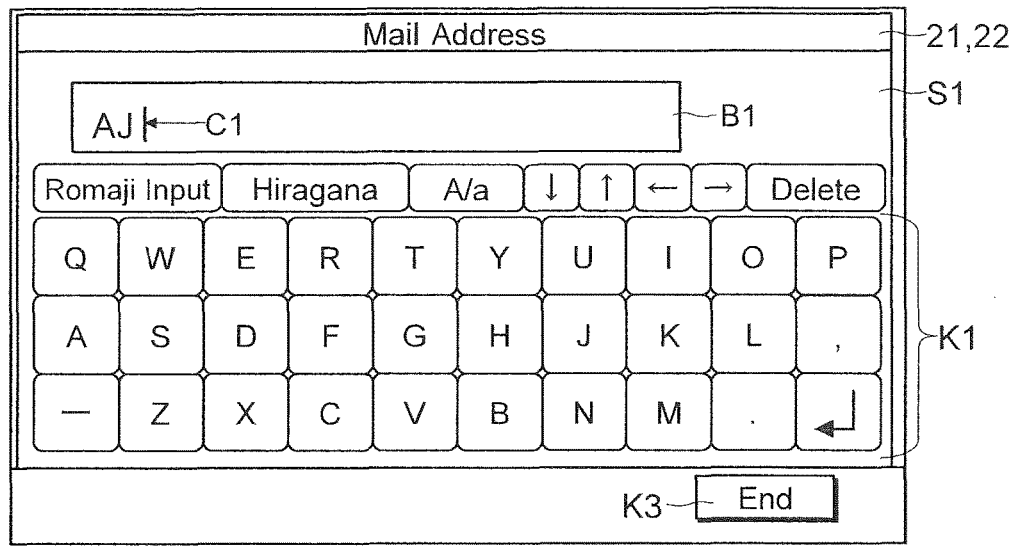
FIG. 15 is a diagram illustrating an example of a case where a correction key according to the embodiment has been operated.
FIG. 16 is a diagram illustrating an example of data of automatic expansion of the area of a peripheral region according to the embodiment.

FIG. 15 illustrates an example of a case in which correction is performed by replacement to a symbol "J", which corresponds to a symbol key K1 that is located close to the symbol key K1 corresponding to the symbol "B" after the input confirmation screen S7 is displayed in response to an operation performed on the symbol key K1 corresponding to the symbol "B" in FIG. 12. After the input confirmation screen S7 is displayed, if the symbol key K1 corresponding to the symbol "J" is touched soon after the correction key K9 is touched, the control unit 5 recognizes that the symbol "B" should be replaced with the symbol "J". Then, as illustrated in FIG. 15, the control unit 5 makes the display panel 21 produce a normal display of the symbol "J" instead of the symbol "B", which has been displayed in the input display field B1 as the questionable symbol y1.

Minimum Alert Mode: Next, based on FIG. 7, a description will be given of an alert display produced in a minimum alert mode of the display input device 1.

In the minimum alert mode, too, an alert display of a questionable symbol y1 is sure produced. In the minimum alert mode, however, in contrast to in the re-input mode and in the input confirmation mode, even when the peripheral region F2 of an operated symbol key K1a is touched, no screen, such as the message screen S6 or the input confirmation screen S7, is displayed to be superimposed on the software keyboard screen S1.

Thus, an alert display will be produced of a symbol corresponding to a symbol key K1 the touch position with respect to which is inside the peripheral region F2. Difference from a normal input of a symbol, however, is only that an alert display of a questionable symbol y1 is produced, and there is no other difference.

Automatic Expansion of Peripheral Region F2: Next, with reference to FIG. 16, a description will be given of automatic expansion of the area of the peripheral region F2 according to the embodiment.

Items regarding address registration, such as an e-mail address, a fax number, and a network address, are also included in the symbol input items. If a registered address includes an erroneously inputted part, it may sometimes cause a communication error and prevent correct transmission of data, or cause meaningless transmission of data to be repeated on and on in a case where a redialing function is provided. Further, with a wrong fax number, data may be transmitted to a completely unrelated destination. Thus, it is particularly unfavorable to overlook an input error made in inputting an address.

To prevent such cases, the control unit 5 increases the proportion of the peripheral region F2 of the symbol keys K1 in the software keyboard screen S1 for registration of addresses such as an e-mail address, a fax number, a network address, and a network path to be larger than in the software keyboard screen S1 for inputting symbol input items other than addresses. As a result, the alert display, the message screen S6, and the input confirmation screen S7 become more likely to be displayed, and this helps make an input error less likely to happen.

Specifically, the symbol input items are divided into an expansion group and a normal group. With respect to items in the normal group, the inner region F1 and the peripheral region F2 are determined based on the respective dimensions set in the region setting screen S5. With respect to items in the expansion group, the peripheral region F2 is increased to be larger than it is at the time of inputting symbols for the items in the normal group. The storage unit 6 stores therein input item data D3, which indicates which group each of the symbol input items belongs to (see FIG. 2). FIG. 16 illustrates an example of the input item data D3.

Determined in the input item data D3 is which group each of the symbol input items belongs to. The width of the peripheral region F2 may be increased by the same proportion for all the symbol input items in the expansion group. Or, there may be defined information to set an extent to which the peripheral region F2 is to be expanded with respect to each of the symbol input items in the expansion group (see FIG. 16). In the input item data D3 illustrated in FIG. 16, it is determined that fax number in the address book is in the expansion group, and that the entire region of the symbol keys K1 is the peripheral region F2. Thereby, whenever digits are inputted as a fax number, alert displays are produced according to whichever of the display modes has been selected. This helps achieve a significant reduction of input errors made in inputting digits of fax numbers. Further, in the input item data D3 illustrated in FIG. 16, it is determined that the input item of e-mail address of the address book is in the expansion group, and that the peripheral region F2 of the symbol keys K1 is twice larger than that for the normal group. This helps reduce cases in which data does not reach an intended destination due to an erroneously inputted e-mail address.

Expanded Display of Symbol Keys K1: Next, a description will be given of expanded display of the symbol keys K1 according to the embodiment, with reference to FIG. 17.

When there is a possibility of an input error having been made, in order to help the user input a correct symbol easily, the display input device 1 temporarily displays, in an expanded manner, a symbol key K1 that may have been touched erroneously and some symbol keys K1b adjacent to the symbol key K1. FIG. 9 to FIG. 15 each illustrate a state in which none of the symbol keys is displayed in an expanded manner. Whether to display in an expanded manner can be set on the operation panel 2. With a setting such that an expanded display is to be produced, the control unit 5 makes the display panel 21 produce a display in an expanded manner. On the other hand, when the setting is such that no expanded display is to be produced, the control unit 5 makes the display panel 21 produce an unexpanded display of the symbol key K1.

When a position at which a touch has been performed on the operated symbol key K1a is inside the peripheral region F2, the control unit 5 makes the display panel 21 produce an alert display in accordance with the display mode. And, with a setting such that an expanded display is to be performed, the control unit 5 makes the display panel 21 continue producing expanded displays of the operated symbol key K1*a*, in the peripheral region F2 of which a touch has been performed, and symbol keys K1*b* adjacent to the operated symbol key K1*a* while the alert display is being produced. After the questionable symbol y1 is confirmed, corrected, or deleted, the control unit 5 restores these symbol keys K1 to their normal sizes.

Figure 17:
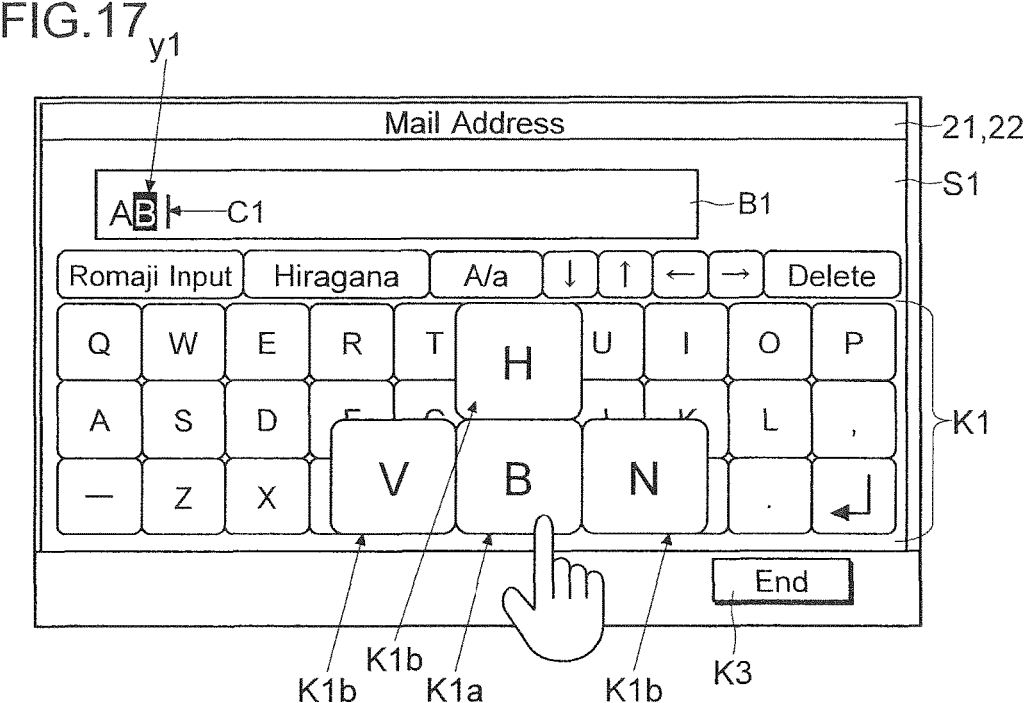
FIG. 17 is a diagram illustrating an example of an expanded display of a symbol key according to the embodiment.

FIG. 17 illustrates an example of expansion of a symbol key K1 of which an alert display is being produced. In FIG. 6, the symbol "B" is a questionable symbol y1 (that is, a symbol key o an alert display f which is being produced). That is, the symbol key K1 corresponding to "B" has been touched at a position in the peripheral region F2, and thus the alert display thereof is being produced. And, as illustrated in FIG. 17, the control unit 5 makes the display panel 21 produce expanded displays of the symbol key K1 corresponding to the symbol B", and symbol keys K1 adjacent to the symbol key K1, namely, the symbol keys K1 corresponding to "H", "V", and "N". In the re-input mode, the control unit 5 makes the display panel 21 further display the message screen S6, and in the input confirmation mode, the control unit 5 makes the display panel 21 further display the input confirmation screen S7.

As has been described above, according to the embodiments, the display input device 1 includes the display panel 21, the touch panel unit 22, and the control unit 5. The display panel 21 displays a software keyboard screen S1 for inputting symbols. The software keyboard screen S1 includes the plurality of arranged symbol keys K1 and the input display field B1. In the input display field B1, the display panel 21 displays a symbol corresponding to any of the symbol keys K1 a display position of which has been touched. The touch panel unit 22 is provided with respect to the display panel 21 and detects a touch position at which the display panel 21 is touched by the user. Based on the output of the touch panel unit 22, the control unit 5 recognizes the operated symbol key K1*a*, which is one of the symbol keys K1 displayed at a touch position touched by the user. When the touch position is inside the inner region F1, which is previously determined in the region of the operated symbol key K1*a*, the control unit 5 makes the input display field B1 produce a normal display of the symbol corresponding to the operated symbol key K1*a*. When the touch position is inside the peripheral region F2, which is a region outside of the inner region F1 in the region of the operated symbol key K1*a*, the control unit 5 makes the display panel 21 produce an alert display of a questionable symbol y1 in a manner different from a manner in which a normal display is produced, the questionable symbol y1 being a symbol corresponding to the operated symbol key K1*a* operated in the peripheral region F2.

When a symbol key K1 is touched at a position away from a center of the symbol key K1, there is a possibility that the user has operated a wrong symbol key K1. According to the display input device 1 of the present embodiment, when there is a possibility that the user has touched a wrong symbol key K1*b* adjacent to a correct symbol key K1 by mistake, the control unit 5 is able to make the symbol corresponding to the operated symbol key K1*a* be displayed in a manner different from normal. This helps the user become aware that he or she has made an input error soon after touching a wrong symbol key K1. Thus, even if the user has made an input error, the erroneously inputted symbol can be corrected immediately, and this makes correction easier than in a case where the user does not become aware of an input error until he or she has inputted a plurality of more symbols after the input error.

Further, the display input device 1 has a plurality of display modes as modes in which to display a questionable symbol y1 in an alert display. In a case where the re-input mode is selected in advance from among the display modes, when the user has operated an operated symbol key K1*a* in the peripheral region F2, the control unit 5 makes the display panel 21 display the message screen S6 to request the user to touch again a symbol key K1 same as the symbol key K1 corresponding to the questionable symbol y1. When the same symbol key K1 is touched again after the message screen S6 is displayed, the control unit 5 recognizes this operation as an operation for confirming the questionable symbol y1, and makes the display panel 21 switch the display state of the questionable symbol y1 from alert display to normal display. Thus, when there is a possibility of an erroneous touch having been performed on a symbol key K1, by the display of the message screen S6 and the re-touching (re-inputting), it is possible to make the user confirm, without fail, whether the inputted symbol is correct.

Further, in the re-input mode, when the same symbol key K1 is not touched again but a symbol key K1 other than the symbol key K1 corresponding to the questionable symbol y1 is touched a predetermined number of times after the message screen S6 is displayed, the control unit 5 recognizes such an operation as an operation for correction by replacing the questionable symbol y1 with a symbol corresponding to the symbol key K1 that has been touched the predetermined number of times, and the control unit 5 makes the display panel 21 display the correct symbol in the normal display instead of the display of the questionable symbol y1. In this manner, when an input error has been made, it is possible to replace (correct) the questionable symbol y1 with a correct symbol by merely touching the symbol key K1 corresponding to the correct symbol repeatedly a plurality of number of times. Thus, correction by replacement to the correct symbol can be performed easily. Here, the predetermined number of times is twice, for example, but it may be determined as necessary.

Further, in a case where the input confirmation mode has been selected in advance from among the display modes, when the operated symbol key K1*a* is operated by touching the peripheral region F2 of the operated symbol key K1*a*, the control unit 5 makes the display panel 21 display the input confirmation screen S7, which includes the confirmation key K7, the delete key K8, and the correction key K9. Then, when the user touches the confirmation key K7, the control unit 5 recognizes it as an operation to confirm the questionable symbol y1, and makes the display panel 21 switch the display state of the questionable symbol y1 from alert display to normal display. When the user touches the delete key K8, the control unit 5 recognizes it as an operation for commanding deletion of the questionable symbol y1, and makes the display panel 21 delete the display of the questionable symbol y1. When the user touches the correction key K9, the control unit 5 recognizes it as an operation for correction by replacing the questionable symbol y1 with a symbol corresponding to a symbol key K1 that the user touches next to the correction key K9, and makes the display panel 21 display in the normal display a correct symbol instead of the questionable display y1. In this manner, when there is a possibility that the user has erroneously touched a symbol key K1, it is possible for the user to confirm whether an inputted symbol is correct or not, to delete the questionable symbol y1, or to correct a wrong symbol, by merely operating a corresponding one of the keys displayed in the input confirmation screen S7.

Further, some users may feel bothered by the display of messages and screens for confirmation presented when there is a possibility of an erroneous touch having been performed on a symbol key K1. The minimum alert mode is provided for such users, and when the peripheral region F2 of the operated symbol key K1a is touched in a case where the minimum alert mode has been selected, the control unit 5 makes the questionable symbol y1 be displayed in an alert display, and prevents the display panel 21 from displaying an additional message or another screen on the software keyboard screen S1. Thereby, it is possible to meet such users' demand by just producing an alert display when there is a possibility of an erroneous touch having been performed on a symbol key K1.

Further, the display panel 21 displays the region setting screen S5 for setting the dimensions of the inner region F1 and the peripheral region F2. The control unit 5 recognizes whether a touch position is inside the inner region F1 or inside the peripheral region F2 based on the dimensions of the respective regions set by means of the region setting key K6. With this configuration, by setting the peripheral region F2 large, alert, re-input, and reconfirmation become more likely to be displayed. Meanwhile, by setting the peripheral region F2 small, alert, re-input, and reconfirmation become less likely to be displayed. Thus, the frequency at which alert, re-input, and reconfirmation are displayed can be set as the user prefers, and the intensity of prevention against input errors can be adjusted.

Further, a plurality of symbol input items are provided, the symbol input items being inputted by inputting symbols constituting them, and classified into the expansion group and the normal group. The control unit 5 increases the proportion of the peripheral region F2 when inputting symbol of a symbol input item belonging to the expansion group to be larger than when inputting symbol of a symbol input item belonging to the normal group. The expansion group includes a symbol input item that defines the address of a communication destination. This makes an alert display more likely to be produced with respect to particular symbol input items erroneous input of which should be prevented, such as an address. Thus, with respect to items in the expansion group, correct information can be inputted and set with higher possibility.

Further, the control unit 5 makes the display panel 21 display the questionable symbol y1 in an alert display by either or both of displaying the questionable symbol y1 in a color different from in the normal display and making a background color of the questionable symbol y1 different from in the normal display. With this configuration, when there is a possibility of one of the symbol keys K1 having been touched erroneously, the questionable symbol y1 displayed in the input display field B1 can be made prominent.

Further, when the operated symbol key K1a is operated in the peripheral region F2, the control unit 5 makes the display panel 21 display the operated symbol key K1a and the symbol keys K1b adjacent to the operated symbol key K1a in an expanded manner. Thereby, symbol keys that can be operated for correction or re-input are displayed in an expanded manner such that no input error will be made in the next input (a touch on another symbol key K1).

Further, the image forming apparatus (the multifunction peripheral 100) includes the display input device 1 described above. With this configuration, an alert display of the questionable symbol y1 is produced to visually appeal to the user, and this helps the user become aware of an input error made in inputting a symbol immediately after he or she makes the input error, and this makes it possible to provide an image forming apparatus (a multifunction peripheral 100) capable of facilitating inputting of symbols.

The present invention can also be considered as a method for controlling the display input device 1. The present invention can also be considered as a program for controlling the display input device 1. With the control method and the control program, it is possible to make the display input device 1 produce an alert display of a questionable symbol y1 to visually appeal to the user, to thereby make the user become aware of an input error that he or she has made in inputting a symbol immediately after he or she has made the input error, and thus to improve the user-friendliness of the display input device 1 in key input operations.

Embodiments of the present invention have been described above, but the scope of the present invention is not limited to the embodiments, and the present invention can be implemented in variously modified forms within the spirit of the invention.

INDUSTRIAL APPLICABILITY

The present invention is applicable to a display input device having a display panel and a touch panel unit, and an image forming apparatus.

The invention claimed is:
1. A display input device comprising:
a display panel that displays a software keyboard screen including a plurality of arranged symbol keys and an input display field for displaying a symbol corresponding to any of the plurality of symbol keys a display position of which has been touched;
a touch panel unit for detecting a touch position touched by a user, the touch panel unit being provided with respect to the display panel;
a control unit
that recognizes an operated symbol key based on output of the touch panel unit, the operated symbol key being any of the plurality of symbol keys that is displayed at the touch position touched by the user,
that makes the input display field produce a normal display of a symbol corresponding to the operated symbol key when the touch position is inside a predetermined inner region of a region of the operated symbol key, and
that makes the display panel produce an alert display of a questionable symbol in a manner different from in the normal display when the touch position is inside a peripheral region, the questionable symbol being a symbol corresponding to the operated symbol key operated in the peripheral region, the peripheral region being a region outside of the inner region in the region of the operated symbol key, wherein
the display input device has a plurality of display modes as modes in which to display the questionable symbol in an alert display, and
in a case where an input confirmation mode has been selected from among the display modes,
when the operated symbol key is operated in the peripheral region, the control unit,
makes the display panel display an input for confirmation screen including a confirmation key, a delete key, and a correction key,
recognizes a touch performed on the confirmation key as an operation for confirming the questionable symbol, and makes the display panel switch a display state of the questionable symbol from the alert display to the normal display, recognizes a touch performed on the delete key as an operation for commanding deletion of the questionable symbol, and makes the display panel delete a display of the questionable symbol, and recognizes a touch performed on the correction key as an operation for correction by replacing the questionable symbol with a correct symbol corresponding to a symbol key touched after the touch performed on the correction key, and makes the display panel produce a normal display of the correct symbol instead of the display of the questionable symbol.

2. The display input device according to claim 1, wherein the display input device has a plurality of display modes as modes in which to display the questionable symbol in an alert display, and when the operated symbol key is operated in the peripheral region in a case where a re-input mode has been selected in advance from among the display modes, the control unit makes the display panel display a message screen requesting a touch to be performed again on a same symbol key as a symbol key corresponding to the questionable symbol, recognizes an operation of touching the same symbol key again after the message screen is displayed as an operation for confirming the questionable symbol, and makes the display panel switch a display state of the questionable symbol from the alert display to the normal display.

3. The display input device according to claim 2, wherein when the same symbol key has not touched again but a symbol key other than the symbol key corresponding to the questionable symbol has been touched a predetermined number of times after the message screen is displayed, the control unit recognizes that an operation has been performed to replace the questionable symbol with a correct symbol corresponding to the symbol key which has been touched a predetermined number of times, and makes the display panel produce a normal display of the correct symbol.

4. The display input device according to claim 1, wherein the display input device has a plurality of modes as display modes in which to display the questionable symbol in an alert display, and in a case where a minimum alert mode has been selected from among the plurality of display modes, when the operated symbol key is operated in the peripheral region, the control unit makes the questionable symbol be displayed in the alert display, and prevents the display panel from displaying an additional message and an additional screen on the software keyboard screen.

5. The display input device according to claim 1, wherein the display panel displays a region setting screen for setting dimensions of the inner region and the peripheral region, and the control unit recognizes whether a touch position is inside the inner region or inside the peripheral region based on the dimensions of the inner region and the peripheral region set in the region setting screen.

6. The display input device according to claim 5, wherein the region setting screen includes:

a value input field for determining, regarding a lateral direction of the symbol keys, a proportion of a lateral width of the inner region with respect to a lateral width of the symbol keys, a proportion of a left-side width of the peripheral region with respect to the lateral width of the symbol keys, and a proportion of a right-side width of the peripheral region with respect to the lateral width of the symbol keys; and a value input field for determining, regarding a vertical direction of the symbol keys, a proportion of a vertical width of the inner region with respect to a vertical width of the symbol keys, a proportion of an upper-side width of the peripheral region with respect to the vertical width of the symbol key, and a proportion of a lower-side width of the peripheral region with respect to the vertical width of the symbol keys.

7. The display input device according to claim 1, wherein a plurality of symbol input items are provided, the symbol input items being inputted by inputting symbols constituting the symbol input items, and are classified into an expansion group and a normal group, and the control unit makes a proportion of the peripheral region larger in inputting symbols constituting any of the item input items in the expansion group than in inputting symbols constituting any of the item input items in the normal group, and the expansion group includes such a symbol input item of the symbol input items as defines an address of a communication destination.

8. The display input device according to claim 1, wherein the control unit makes the display panel display the questionable symbol in the alert display by either or both of displaying the questionable symbol in a color different from in the normal display and making a background color of the questionable symbol different from in the normal display.

9. The display input device according to claim 1, wherein the control unit makes the display panel produce an expanded display of the operated symbol key and an expanded display of a symbol key adjacent to the operated symbol key when the operated symbol key has been operated in the peripheral region.

10. The display input device according to claim 1, wherein the display panel displays an ON key for making a setting such that an alert display is to be performed and an OFF key for making a setting such that no alert display is to be performed, and the control unit recognizes whether to perform the alert display based on output of the touch panel unit, makes the display panel produce the alert display of the questionable symbol only when the alert display has been set to be performed, and prevents the display panel from producing the alert display of the questionable symbol when the alert display is set not to be produced.

11. A method for controlling a display input device, the method comprising:

displaying, in a software keyboard screen for inputting a symbol, a plurality of arranged symbol keys and an input display field for displaying a symbol corresponding to any of the plurality of symbol keys a display position of which has been touched, detecting a touch position touched by a user;

recognizing an operated symbol key, the operated symbol key being a symbol key displayed at the touch position touched by the user;

producing a normal display of a symbol corresponding to the operated symbol key in the input display field when the touch position is inside a predetermined inner region of a region of the operated symbol key; and displaying a questionable symbol in a manner different from in the normal display when the touch position is inside a peripheral region, the questionable symbol being a symbol corresponding to the operated symbol key operated in the peripheral region;

the peripheral region being a region outside of the inner region in the region of the operated symbol key;

providing a plurality of display modes as modes in which to display the questionable symbol in an alert display, in a case where an input confirmation mode has been selected from among the display modes, when the operated symbol key is operated in the peripheral region, displaying an input for confirmation screen, including a confirmation key, a delete key, and a correction key, recognizing a touch performed on the confirmation key as an operation for confirming the questionable symbol switching a display state of the questionable symbol from the alert display to the normal display, recognizing a touch performed on the delete key as an operation for commanding deletion of the questionable symbol, and deleting a display of the questionable symbol, and recognizing a touch performed on the correction key as an operation for correction by replacing the questionable symbol with a correct symbol corresponding to a symbol key touched after the touch performed on the correction key, and producing, a normal display of the correct symbol instead of the display of the questionable symbol.

12. A non-transitory computer-readable storage medium for storing a program for controlling a display input device, wherein the program makes a display input device display, in a software keyboard screen for inputting symbols, a plurality of arranged symbol keys and an input display field for displaying a symbol corresponding to any of the plurality of symbol keys a display position of which has been touched, detect a touch position touched by a user, recognize an operated symbol key, the operated symbol key being a symbol key displayed at the touch position touched by the user, produce a normal display of a symbol corresponding to the operated symbol key in the input display field when the touch position is inside a predetermined inner region of a region of the operated symbol key, and display a questionable symbol in a manner different from in the normal display when the touch position is inside a peripheral region, the questionable symbol being a symbol corresponding to the operated symbol key that has been operated in the peripheral region, the peripheral region being a region outside of the inner region in the region of the operated key, in a case where an input confirmation mode has been selected as an input mode in which to display the questionable symbol in an alert display, when the operated symbol key is operated in the peripheral region, the program make the display input device, display an input for confirmation screen including a confirmation key, a delete key, and a correction key, recognize a touch performed on the confirmation key as an operation for confirming the questionable symbol and switch a display state of the questionable symbol from the alert display to the normal display, recognize a touch performed on the delete key as an operation for commanding deletion of the questionable symbol and delete a display of the questionable symbol, and recognize a touch performed on the correction key as an operation for correction by replacing the questionable symbol with a correct symbol corresponding to a symbol key touched after the touch performed on the correction key, and produce a normal display of the correct symbol instead of the display of the questionable symbol.

* * * * *